(12) United States Patent
Zeffer et al.

(10) Patent No.: US 10,462,267 B2
(45) Date of Patent: Oct. 29, 2019

(54) METHOD AND APPARATUS FOR PRE-CLASSIFYING PACKETS

(71) Applicant: Marvell World Trade Ltd., St. Michael (BB)

(72) Inventors: Hakan Zeffer, Enskede (SE); Jakob Carlstrom, Uppsala (SE); Par Westlund, Stockholm (SE); Johan Back, Huddinge (SE); Ronny Nilsson, Stockholm (SE)

(73) Assignee: Marvell World Trade Ltd., St. Michael (BB)

( * ) Notice: Subject to any disclaimer, the term of this patent is extended or adjusted under 35 U.S.C. 154(b) by 60 days.

(21) Appl. No.: 15/169,011

(22) Filed: May 31, 2016

(65) Prior Publication Data

US 2016/0277549 A1 Sep. 22, 2016

Related U.S. Application Data

(63) Continuation of application No. 14/679,346, filed on Apr. 6, 2015, which is a continuation of application
(Continued)

(51) Int. Cl.
*H04L 12/28* (2006.01)
*H04L 29/06* (2006.01)
(Continued)

(52) U.S. Cl.
CPC .............. *H04L 69/22* (2013.01); *H04L 45/70* (2013.01); *H04L 45/74* (2013.01); *H04L 47/2441* (2013.01); *H04L 67/10* (2013.01)

(58) Field of Classification Search
CPC ..... H04L 47/2441; H04L 69/22; H04L 45/74; H04L 45/70; H04L 67/10
(Continued)

(56) References Cited

U.S. PATENT DOCUMENTS 7,185,081 B1   2/2007 Liao
8,804,733 B1 * 8/2014 Safrai ................... H04L 49/10
                                                         370/392
(Continued)

FOREIGN PATENT DOCUMENTS

CN    1561051 A    1/2005
EP   1 345 380 A2   9/2003
(Continued)

OTHER PUBLICATIONS

Combined Taiwanese Office Action and Search Report dated Jun. 2, 2016 in Patent Application No. 101109352 (with English Translation of Categories of Cited Documents).
(Continued)

*Primary Examiner* — Noel R Beharry
*Assistant Examiner* — Lionel Preval

(57) ABSTRACT

The disclosed embodiments relate to a system that provides an intelligent port infrastructure for communication network devices. This is accomplished by incorporating a highly configurable pre-classifier module into the port infrastructure. This pre-classifier makes it possible to realign packet data to add a configurable number of bytes to the front of the packet, and also to select interesting data from incoming packets for further analysis. The selected data is sent into a configurable classification engine, which generates instructions that specify how to determine associated packet attributes. The packet attributes are then generated based on the instructions, and are forwarded along with the packet to downstream processing units.

23 Claims, 8 Drawing Sheets

Related U.S. Application Data

No. 13/052,336, filed on Mar. 21, 2011, now Pat. No. 9,001,828.

(51) Int. Cl.

| | | |
|---|---|---|
| *H04L 12/851* | (2013.01) | |
| *H04L 12/741* | (2013.01) | |
| *H04L 12/721* | (2013.01) | |
| *H04L 29/08* | (2006.01) | |

(58) Field of Classification Search
USPC .................................. 370/392, 408; 398/49
See application file for complete search history.

(56) References Cited

U.S. PATENT DOCUMENTS

| | | | |
|---|---|---|---|
| 2003/0063348 A1* | 4/2003 | Posey, Jr. | ................ H04L 45/00 |
| | | | 398/49 |
| 2004/0095936 A1* | 5/2004 | O'Neill | .................... H04L 45/00 |
| | | | 370/392 |
| 2006/0002386 A1 | 1/2006 | Yik et al. | |
| 2006/0039374 A1 | 2/2006 | Belz et al. | |
| 2007/0058632 A1 | 3/2007 | Back et al. | |
| 2007/0115966 A1 | 5/2007 | Tzeng | |
| 2007/0183415 A1* | 8/2007 | Fischer | ............... H04L 49/3009 |
| | | | 370/389 |
| 2007/0189327 A1 | 8/2007 | Konda | |
| 2007/0195761 A1 | 8/2007 | Tatar et al. | |
| 2008/0192754 A1 | 8/2008 | Ku et al. | |
| 2008/0205403 A1* | 8/2008 | Akyol | ................ H04L 45/7453 |
| | | | 370/392 |
| 2008/0279205 A1* | 11/2008 | Sgouros | ................ H04L 45/745 |
| | | | 370/408 |
| 2010/0002703 A1 | 1/2010 | Kogata et al. | |
| 2011/0038375 A1 | 2/2011 | Liu et al. | |
| 2012/0218894 A1* | 8/2012 | Assarpour | ............... H04L 49/65 |
| | | | 370/235 |

FOREIGN PATENT DOCUMENTS

| | | |
|---|---|---|
| EP | 1 345 380 A3 | 9/2003 |
| GB | 2 401 279 A | 11/2004 |
| WO | WO 02/078273 A1 | 10/2002 |

OTHER PUBLICATIONS

International Search Report and Written Opinion of International Searching Authority, dated Jun. 20, 2012 in counterpart International Application No. PCT/IB2012/000680.

Combined Chinese Office Action and Search Report dated Aug. 6, 2015 in Patent Application No. 201280014287.2 (with English language translation and English translation of categories of cited documents).

Office Action dated Aug. 20, 2015 in European Patent Application No. 12 714 840.1.

Summons to attend oral proceedings pursuant to Rule 115(1) EPC dated Feb. 9, 2018 in corresponding European Patent Application No. 12714840.1, 9 pages.

S. Blake et al., "RFC 2475: An Architecture for Differentiated Services", The Internet Society (1998), X P-002220520, Dec. 1998, pp. 1-36.

\* cited by examiner

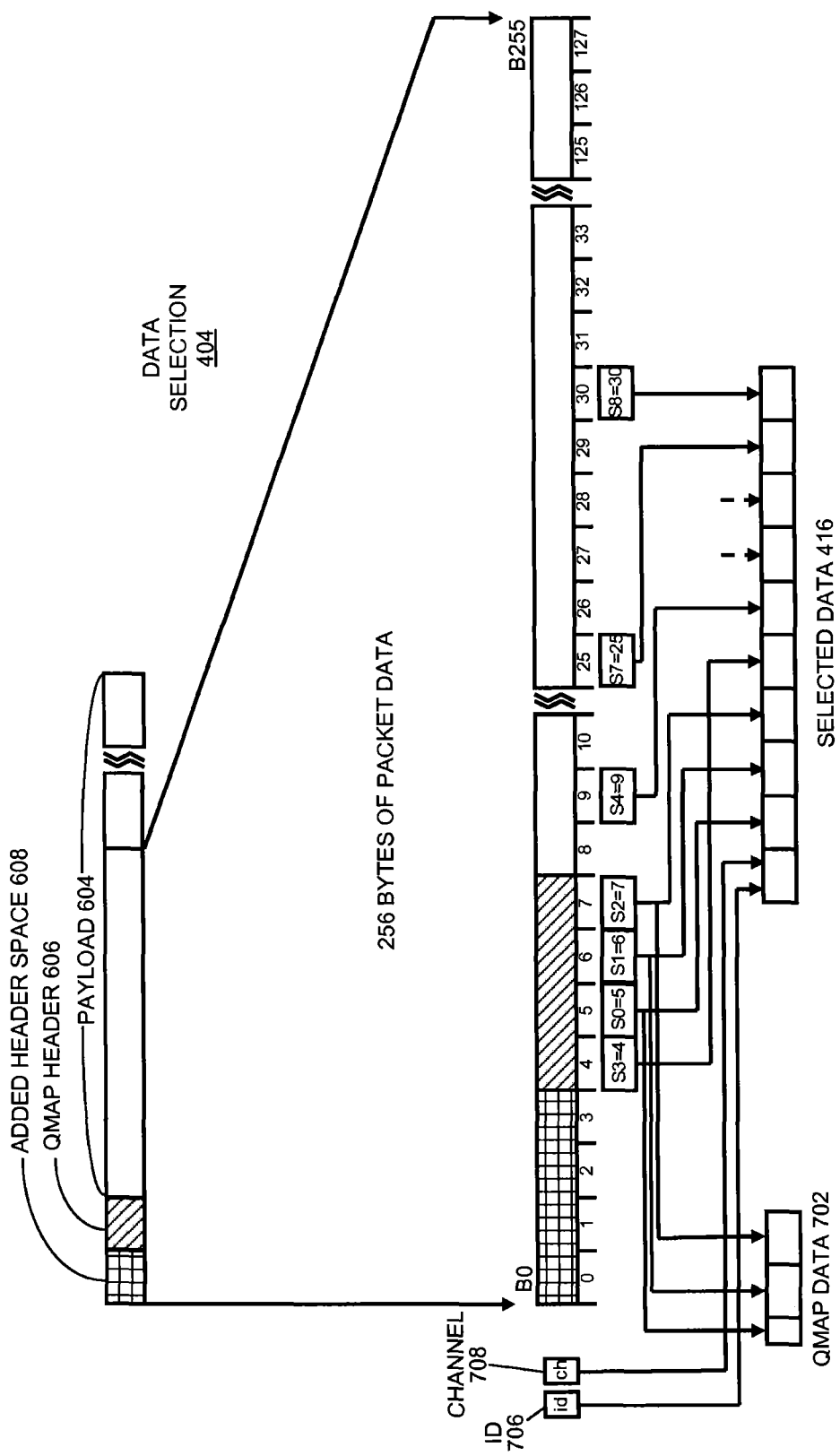

```
PktAttr.MappingType = 0;
PktAttr.PacketType = 0;
PktAttr.Color = BaseColr;
PktAttr.CoS = RESERVED;
PktAttr.Source = RESERVED;
PktAttr.Destination = BaseDest;
PktAttr.Copies = 1;
PktAttr.MirrorEn = 0;
PktAttr.MirrorQ = RESERVED;
PktAttr.PBase = BasePBase;
```

FIG. 8A

```
PktAttr.MappingType = Val.MappingType;
PktAttr.PacketType = Val.PktType;
PktAttr.Color = Val.Colr;
PktAttr.CoS = Val.CoS;
PktAttr.Source = Val.SrcSel == 0 ? Val.Src : Qmap.Src;
switch (Val.DestOp) {
    case 0: PktAttr.Destination = Val.Dest;
            break;
    case 1: PktAttr.Destination = Val.Dest + Qmap.Dest;
            break;
    case 2: PktAttr.Destination = Val.Dest + BaseDest;
            break;
    case 3: PktAttr.Destination = Val.Dest + BaseDest + Chnl;
            break;
    case 4: PktAttr.Destination = Val.Dest + BaseDest + (Chnl<<1);
            break;
    case 5: PktAttr.Destination = Val.Dest + BaseDest + (Chnl<<3);
            break;
}
PktAttr.Copies = Val.CpsSel == 0 ? Val.Cps ? Qmap.Cps;
PktAttr.MirrorEn = Val.MirrorEn;
PktAttr.MirroQ = Val.MirrorQ;
switch (Val.PBaseOp) {
    case 0: PktAttr.PBase = BasePBase;
            break;
    case 1: PktAttr.PBase = Val.PBase;
            break;
    case 2: PktAttr.PBase = BasePBase + Val.PBase;
            break;
    case 3: PktAttr.PBase = BasePBase - Val.PBase;
            break;
}
```

FIG. 8B

METHOD AND APPARATUS FOR PRE-CLASSIFYING PACKETS

INCORPORATION BY REFERENCE

This application is a continuation of U.S. application Ser. No. 14/679,346, filed Apr. 6, 2015, which is a continuation of U.S. application Ser. No. 13/052,336, "Method and Apparatus for Pre-Classifying Packets" filed on Mar. 21, 2011, the entire contents of each which are incorporated herein by reference.

BACKGROUND

Field

The disclosed embodiments generally relate to packet-processing systems associated with communications networks. More specifically, the disclosed embodiments relate to a method and an apparatus for pre-classifying packets and determining per-packet attributes for subsequent packet-processing operations.

Related Art

Traditional ports in communication networks receive packets and forward them to a main processing unit where they are classified, modified, metered, counted, and forwarded to the next destination. Traditional ports work well in most scenarios. However, there are a few scenarios where more intelligence is needed at the port level. For example, in oversubscribed scenarios, the main processing unit is not able to process all incoming packets, which can lead to packets being dropped. In these scenarios, it is important to be able to drop "best effort" traffic, and not to drop control packets or other important packets.

Moreover, different packets may be directed to different destinations in the packet-processing device. For example, some packets may be destined for the main processing unit and others may be destined for a configuration unit. Hence, it is useful for ports to be able to rapidly and efficiently determine the destination for a packet. These differing destinations are also significant because packets may require different packet attributes depending upon what type of processing device they are targeted for.

Traditional ports in communication network devices typically do not incorporate the above-described functionality or intelligence. Hence, what is needed is a method and an apparatus which provides such functionality at the port level.

SUMMARY

The disclosed embodiments relate to a system that provides an intelligent port infrastructure for communication network devices. This is accomplished by incorporating a highly configurable pre-classifier module into the port infrastructure. This pre-classifier makes it possible to realign packet data to add a configurable number of bytes to the front of the packet, and also to select interesting data from incoming packets for further analysis. The selected data is sent into a configurable classification engine, which generates instructions that specify how to determine associated packet attributes. The packet attributes are then generated based on the instructions, and are forwarded along with the packet to downstream processing units.

In some embodiments, the configurable number of bytes for the packet realignment is determined based at least partly on the input port.

In some embodiments, selecting the data from the one or more locations in the packet involves selecting the data from a set of locations associated with the input port.

In some embodiments, performing the classification operation additionally involves using a channel number associated with the packet and a programmable identifier associated with the input port to perform the classification. (Note that the channel number is received as in-band control information with the packet (i.e., as a header parsed by the port).)

In some embodiments, the system additionally adjusts a packet base pointer based on the classification, wherein the packet base pointer accompanies the packet and points to a specific header in the packet.

In some embodiments, performing the classification operation involves performing a lookup in a lookup structure based on the selected data for the packet.

In some embodiments, the lookup structure is a ternary content-addressable memory (TCAM).

In some embodiments, generating the attributes involves combining one or more of the following: data from the classification result; data from the packet; and information forwarded from the input port.

In some embodiments, the attributes for the packet include one or more of the following: a mapping type; a packet type; a color; a class of service; a destination queue identifier; a number of copies; a mirror enable; a mirror queue identifier; and a packet base pointer.

BRIEF DESCRIPTION OF THE FIGURES

FIG. 7 illustrates the data selection process in accordance with the disclosed embodiments.

FIG. 8A illustrates default values for attributes in an exemplary packet attribute structure in accordance with the disclosed embodiments.

FIG. 8B illustrates how packet attributes are generated in accordance with the disclosed embodiments.

DETAILED DESCRIPTION

Figure 1:
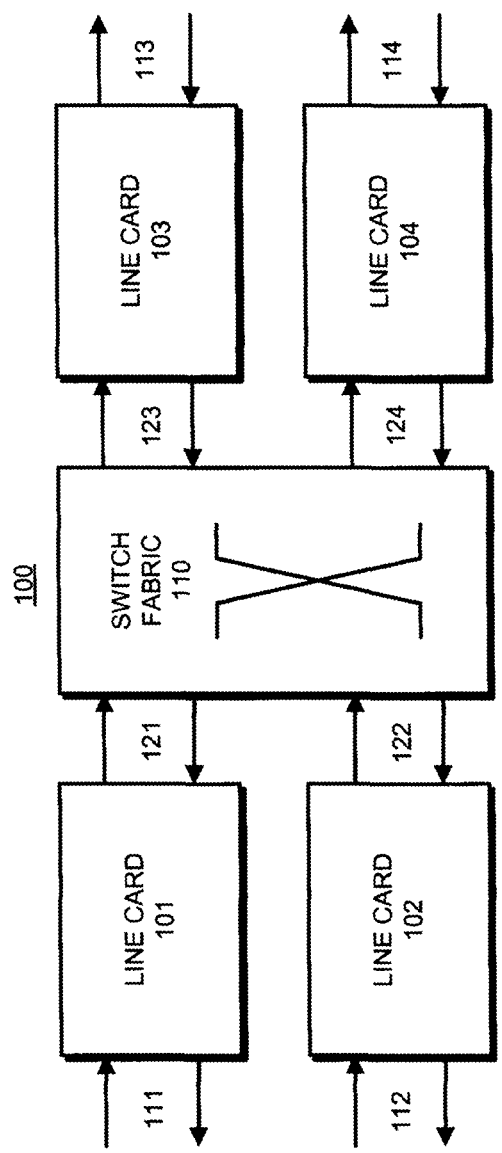
FIG. 1 illustrates a network router or switch in accordance with the disclosed embodiments.

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments make it possible to send packets from multiple ports through a shared pre-classification stage. As mentioned above, this is accomplished by incorporating a configurable pre-classifier module into the port infrastructure. This pre-classifier makes it possible to realign data to add a configurable number of bytes to the front of the packet. The pre-classifier also selects interesting data from incoming packets. This selected data is sent into a configurable classification engine, which generates instructions that specify how to determine associated packet attributes. Note that different ports can be grouped together or separated based on a per port configurable identifier which accompanies each packet through the classification stage. Moreover, each port has its own set of configuration registers that can be used to determine which packet data or control information is to be classified by the classification engine.

As mentioned above, the packet attributes are generated based on the instructions from the classification engine. Then, the attributes are forwarded along with the packet from the output of the port infrastructure to downstream processing units. While generating the packet attributes, some attributes can be taken directly from the packet itself. For example, the destination queue can be taken directly from a packet header in the packet data. Other attributes can be calculated based on the classification results and based on values taken from per-port configuration registers. For example, the destination queue can be calculated as the sum of the classification result, the port's configuration value, and a channel number. This makes the classification extremely flexible yet easy to configure.

The specification that follows describes how these attributes are generated, but first the specification describes how the present invention fits into the context of a networking system.

Network Switch

FIG. 1 illustrates the structure of network router (or network switch) 100 in accordance with the disclosed embodiments. Network router/switch 100 includes a switch fabric 110, which is coupled to a number of line cards 101-104, through associated line card "system interfaces" 121-124. These line cards 101-104 are coupled to various communication lines (e.g., fiber optic links) through associated line card "line interfaces" 111-114.

Figure 2:
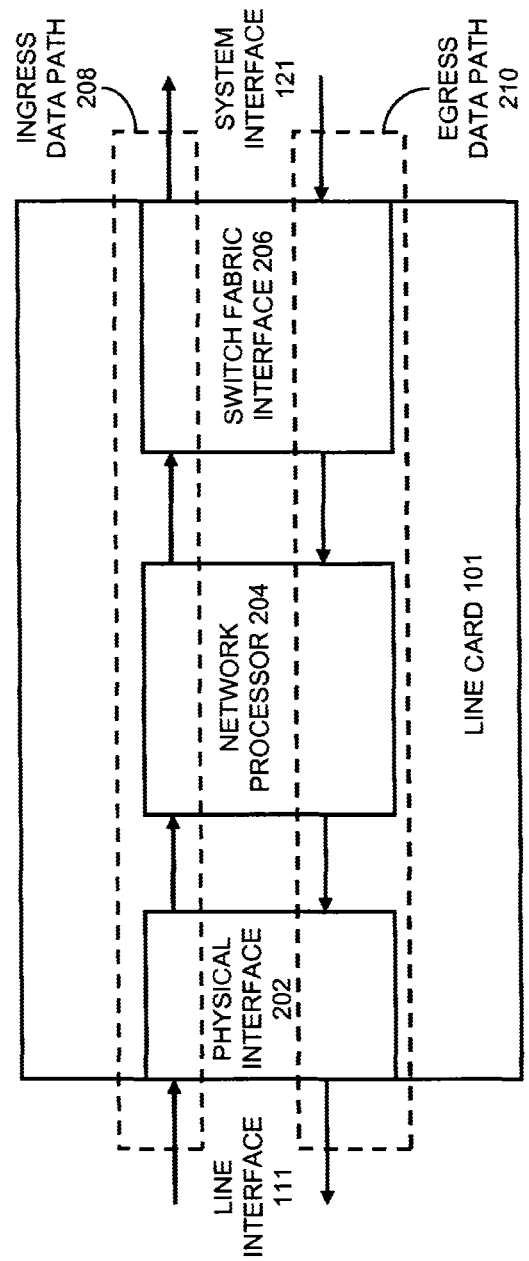
FIG. 2 illustrates a line card in accordance with the disclosed embodiments.

Referring to FIG. 2, line card 101 includes a physical interface 202 that contains circuitry to facilitate communications through line interface 111. Line card 101 also includes a switch fabric interface 206 that contains circuitry to facilitate communications through system interface 121. Physical interface 202 and switch fabric interface 206 are coupled to a network processor 204, which performs various packet-processing operations.

Note that line card 101 provides an "ingress data path" 208 for packets, which flows from line interface 111 through physical interface 202 and network processor 204, and then through switch fabric interface 206 and system interface 121 into switch fabric 110 (see FIG. 1). A corresponding "egress data path" 210 flows in the opposite direction from switch fabric 110 through system interface 121, then through switch fabric interface 206 and network processor 204, and then through physical interface 202 and line interface 111 to an associated communication channel.

Figure 3:
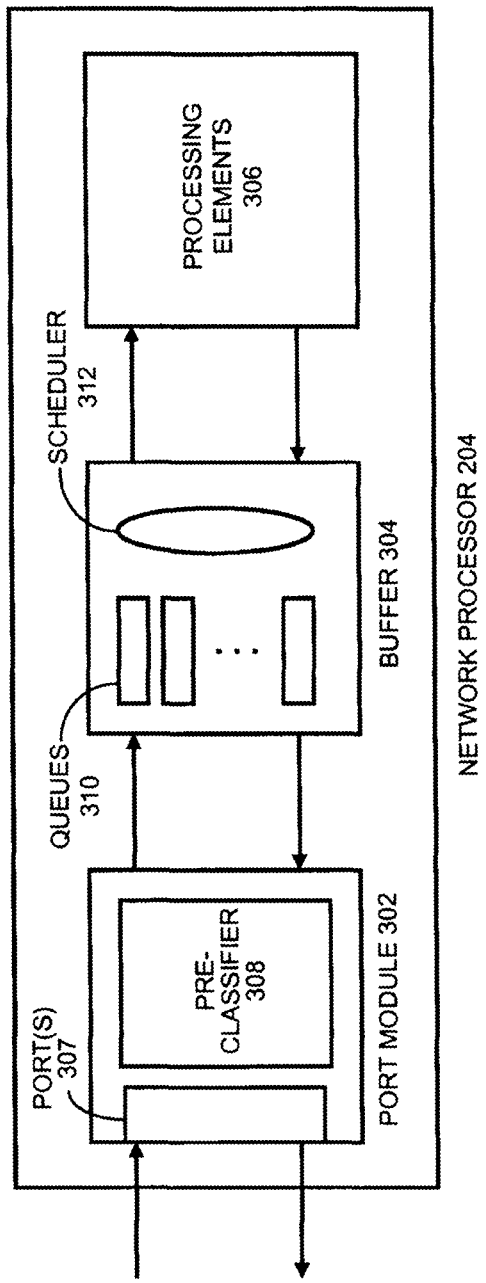
FIG. 3 illustrates a network processor in accordance with the disclosed embodiments.

FIG. 3 illustrates the internal structure of a network processor 204 in accordance with the disclosed embodiments. Network processor 204 includes a port module 302 which includes one or more ports (traffic interfaces) 307. Port module 302 also includes a pre-classifier 308, which performs various pre-classification operations that are described in more detail below. Port module 302 is also coupled to a buffer module, which includes a number of queues 310 for buffering packets. These queues 310 feed into a scheduler 312, which schedules packets to be sent to various destinations through the switch fabric. During this process, buffer 304 drops packets if necessary, for example by implementing a "tail drop" policy.

Port Structure

Figure 4:
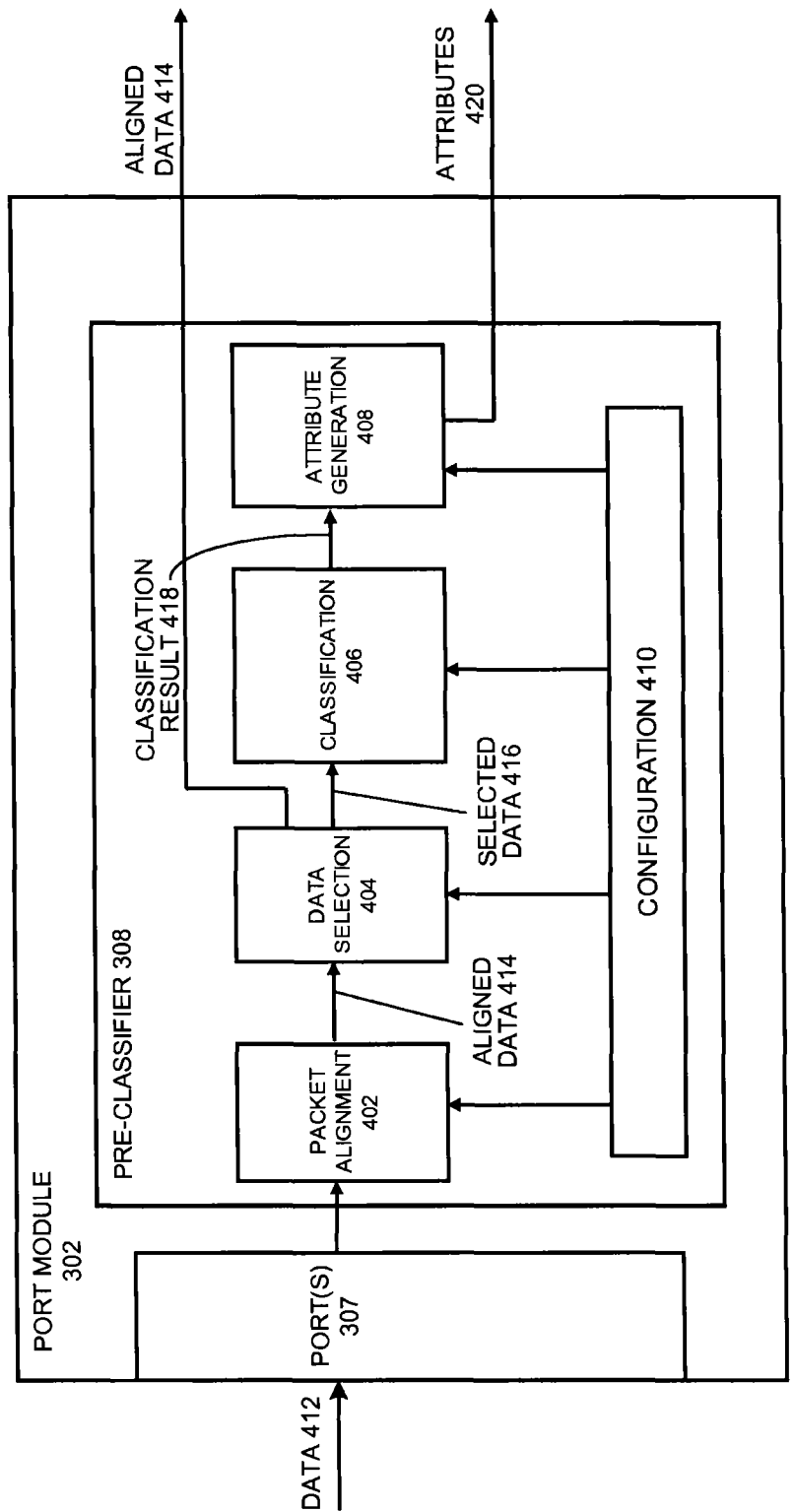
FIG. 4 illustrates the structure of a port which includes a pre-classifier in accordance with the disclosed embodiments.

FIG. 4 illustrates the structure of a port module 302 which includes one or more ports 307 and a pre-classifier 308 in accordance with the disclosed embodiments. As illustrated in FIG. 4, port 302 receives data 412 (in the form of a packet) through port(s) 307 and outputs aligned data 414 and attributes 420. The received data 412 feeds into a pre-classifier 308 within port module 302, and pre-classifier 308 performs a number of operations on the data.

Figure 5:
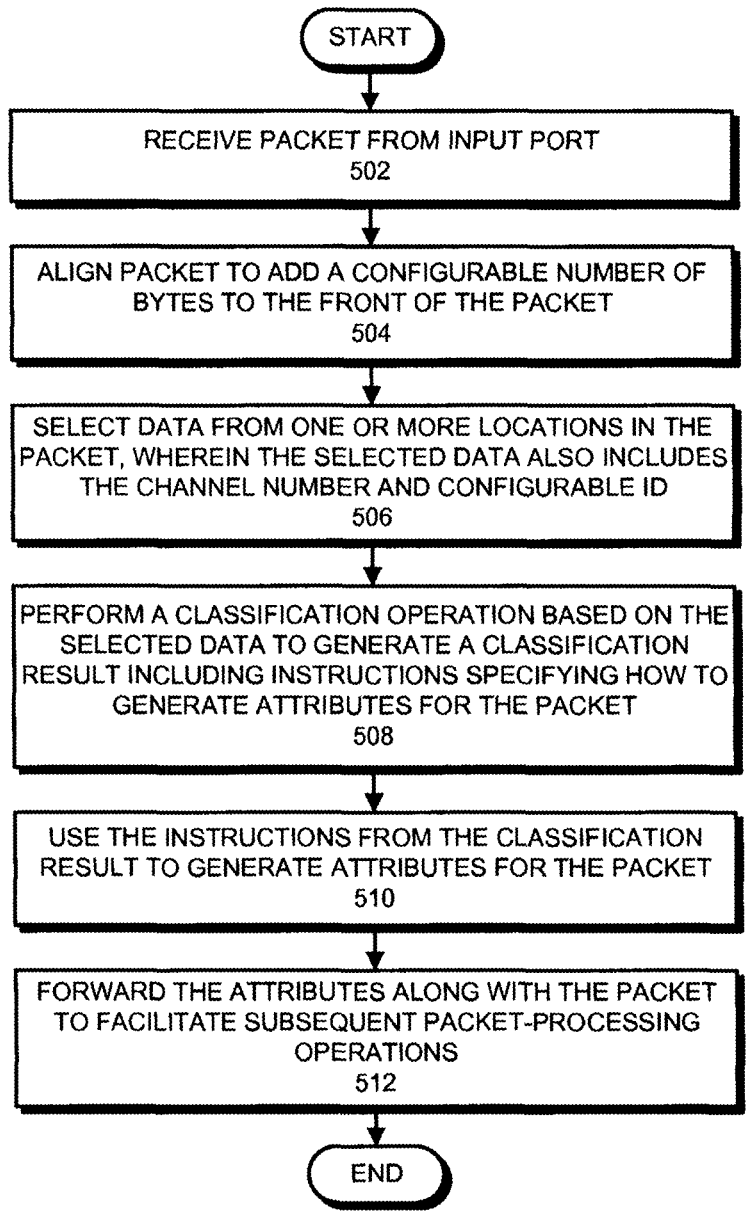
FIG. 5 presents a flow chart illustrating the operations involved in processing a packet in accordance with the disclosed embodiments.

Referring to FIG. 4 and the associated flow chart in FIG. 5, pre-classifier 308 typically operates are follows. First, a packet is received at pre-classifier 308 through port(s) 307 (step 502). Next, data 412 from the packet passes through a packet alignment stage 402, which aligns data 412 to add a configurable number of bytes to the front of the packet to produce aligned data 414 (step 504). The packet alignment process is described in more detail below with reference to FIG. 6.

Next, aligned data 414 passes into a data selection stage 404, which selects data from one or more locations in the packet to produce selected data 416 (step 506), wherein selected data 406 also include the channel number and configurable identifier. This data selection process is described in more detail below with reference to FIG. 7.

Note that aligned data 414 also passes from data selection stage 404 to the output of port module 302.

Selected data 416 then feeds into classification stage 406 which performs a classification operation on selected data 416 to generate a classification result 418, which includes instructions specifying how to generate attributes for the packet (step 508). In one embodiment, the classification operation involves performing a lookup in a lookup structure based on selected data 416. For example, the lookup structure can be a ternary content-addressable memory (TCAM) with 512 entries, which performs the classification lookup, and an associated static random-access memory (SRAM), which provides a ten-byte classification result 418. (Note that using a TCAM makes it possible to perform a longest prefix match, which is useful in many packet-processing operations.) Also note that, instead of using a TCAM, another lookup structure, such as a search tree, can be used to perform the classification. In yet other embodiments, a custom hardware engine or a software programmable microcontroller can be used to perform the classification operation and to provide the classification results.

Next, attribute-generation stage 408 uses the instructions from classification result 418 to generate attributes 420 for the packet (step 510). This attribute-generation process can involve combining data from classification result 418 with configuration values from a corresponding input port and possibly data from the packet itself. This attribute-generation process is described in more detail below with reference to FIG. 8B.

Finally, the attributes 420 are forwarded along with the aligned data 414 in the packet to facilitate downstream packet-processing operations (step 512).

Packet Alignment

Figure 6:
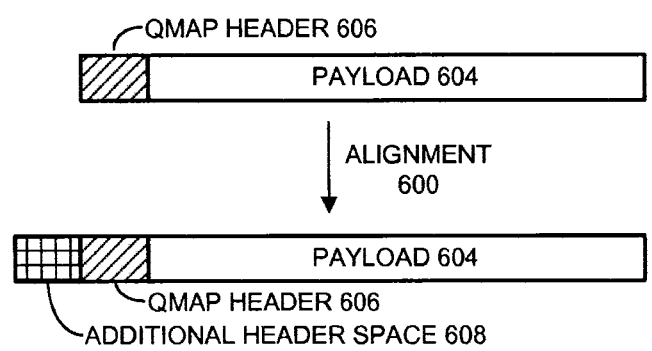
FIG. 6 illustrates the packet alignment process in accordance with the disclosed embodiments.

FIG. 6 illustrates the packet alignment process 600 in accordance with the disclosed embodiments. As illustrated in FIG. 6, before the alignment process, the packet includes a QMAP header 606 and a payload 604. (Note that QMAP header 606 is a proprietary header which can hold buffer enqueue commands and addresses.) After the alignment process 600, additional header space 608 is added to the front of the packet. In one embodiment, the alignment process makes it possible to add up to 127 bytes to the front of the packet. Note that the number of bytes which are added to the front of the packet can depend upon the input port (or input sub-port) from which the packet was received. (The terms "port" and "sub-port" are used interchangeably throughout this disclosure.)

This additional header space 608 can initially be blank and can be populated in downstream stages to include information which accompanies the packet through a backplane or switch fabric. For example, this information can include instructions associated with egress from the backplane or switch fabric. Moreover, this information can be stripped off when the packet leaves the router or switch. Additional header space 608 can also be used to store Multiprotocol Label Switching (MPLS) tags or to make room for inserting Virtual Local Area Network (VLAN) tags. (Note that a VLAN tag can be inserted by shifting an existing header into the additional header space and writing the VLAN tag into the position where the header was.)

Data Selection

FIG. 7 illustrates operation of the data selection stage 404 in accordance with the disclosed embodiments. In the illustrated embodiment, the data selection stage 404 is configurable on a per port basis and lets the user configure selection of up to nine two-byte chunks of data from packets entering the device through a specific port. These nine data-selection points can select data from anywhere within the first 256 bytes of the packet, thereby facilitating L2-L4 classification. For example, the selected data can include a destination MAC address from the packet. Note that the data selection stage 404 can be implemented using a number of multiplexers and the data selection points can be associated with the input port from which the packet was received.

The selected data can also include a configurable ID 706 and channel number 708, which are received from the input port and are configurable on a "per port" basis. Note that configurable ID 706 can be used to group ports together. For example, all gigabit Ethernet ports can be assigned a configurable ID 706 with a one on the most significant bit. These groupings can be used during subsequent classification operations. For example, a higher-priority TCAM entry in classification stage 406 can be configured to direct a packet to a specific destination if the packet originates from a Gigibit Ethernet port and includes a specification destination MAC address. At the same time, a lower-priority entry can direct the packet to another destination if the packet originates from a Gigabit Ethernet port and does not match the higher-priority entry.

In additional to generating 20 bytes of selected data 416, the circuitry illustrated in FIG. 7 also pulls QMAP data 702 out of the packet using selectors S0, S1 and S2, wherein this QMAP data 702 is forwarded to the attribute-generation stage 408.

Packet Attributes

FIG. 8A illustrates default values for specific attributes in an exemplary packet attribute structure in accordance with the disclosed embodiments. Referring to FIG. 8A, the packet attribute structure "PktAttr" includes a number of fields. The first field is MappingType, which indicates whether an associated parameter is direct mapped or indirectly mapped. The default value for this parameter is zero, which indicates that the parameter is direct mapped.

The second field is PacketType, which indicates, for example, whether the packet is unicast or multicast. The default value for this parameter is zero, which indicates that the packet is unicast.

The third parameter is Color, which is a drop precedence parameter that facilitates subsequently determining whether the packet should be dropped from a queue. The default value for this parameter is BaseColr, which is a value defined per port.

The fourth field is CoS, which specifies a class of service for the packet which can similarly be used to determine precedence for the packet in subsequent downstream processing operations. The default value for this parameter is RESERVED.

The fifth field is Source, which indicates whether the source for an associated parameter should be the classification result or the QMAP header. The default value for this parameter is RESERVED.

The sixth field is Destination, which specifies the destination queue for the packet. The operations involved in calculating this field are described below with reference to FIG. 8B. The default value for this parameter is BaseDest, which is a per port defined value.

The seventh parameter is Copies, which specifies a number of copies for the packet, which for example can be used to process multicast packets. The default value for this parameter is one.

The eighth and ninth parameters are MirrorEn, which enables port mirroring, and MirrorQ, which specifies an associated mirror queue. These parameters can be used to facilitate port mirroring. The default value for MirrorEn is zero, which means that port mirroring is disabled, and the default value for MirrorQ is RESERVED.

Finally, the tenth field is PBase, a pointer which points to a specific header in the packet. The operations involved in calculating this pointer are described below with reference to FIG. 8B. The default value for this pointer is BasePBase, which is a per port defined pointer value.

FIG. 8B illustrates how the above-described packet attributes are generated in accordance with the disclosed embodiments. Note that classification result 418 comprises the data structure "Val." First, the attribute mapping type PktAttr.MappingType is set to a corresponding value from classification result 418, namely Val.MappingType. Similarly, PktAttr.PacketType is set to Val.PktType, PktAttr.Color is set to Val.Colr and PktAttr.CoS is set to Val.CoS. Next, PktAttr.Source is set to either Val.Src or Qmap.Src (wherein Qmap.Src is a value from QMAP data 702 illustrated in FIG. 7) depending upon whether a corresponding field Val.SrcSel is set or not.

Next, Val.DestOp is used as an opcode to select a specific technique for calculating the destination for the packet, namely, PktAttr.Destination. In the first case, where Val.DestOp=0, the destination is simply taken from the classification result 418 Val.Dest. In the next case, where Val.DestOp=1, the destination is the sum of Val.Dest and Qmap.Dest (which is taken from QMAP data 702). In the next case, where Val.DestOp=2, the destination is the sum of Val.Dest and BaseDest, which as mentioned above is a per port defined value. In the next three cases, the destination is the sum of Val.Dest and BaseDest and Chnl (wherein Chnl is the per port channel value 708 illustrated in FIG. 7). Note that the Chnl value is selectively shifted by different number of bits for different opcodes. Also note that, by combining a value from the classification result with the per port values BaseDest and Chnl, a large number of different destinations can be specified based on a relatively small number of entries from the TCAM and SRAM in the classifier. This saves a considerable amount of space in the TCAM and SRAM.

Next, PktAttr.Copies is set to either Val.Cps or Qmap.Cps depending upon whether a corresponding field Val.CpsSel is set or not. Then, PktAttr.MirrorEn is set to Val.MirrorEn and PktAttr.MirrorQ is set to Val.MirrorQ.

Finally, Val.PBaseOp is used as an opcode to select a specific technique for calculating a packet base pointer (PktAttr.PBase), which points to a specific header in the packet. In the first case, where Val.PBaseOp=0, the pointer is simply taken from a per port value BasePBase. In the second case, where Val.PBaseOp=1, the pointer is taken from the Val.PBase parameter from classification result 418. In the third and fourth cases, the pointer is computed by either adding or subtracting BasePBase and Val.PBase. In this way, the present invention makes it possible to define a packet base pointer by using both a per port "base value" and the classification results.

Furthermore, other embodiments of the present invention can modify the packet itself by writing classification data into the packet. This can, for example, be used to insert special headers needed for enqueuing in certain packet buffer structures, or to transfer timestamp information or classification information to downstream processing units.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for processing a packet, the method comprising:
    receiving the packet at a classifier from a plurality of input ports connected to the classifier;
    performing a classification operation based upon data selected from within the packet and data other than the data selected from within the packet;
    generating attributes for the packet based upon a result of the classification operation; and
    forwarding the attributes along with the packet to facilitate subsequent packet-processing operations,
    wherein the data selected from within the packet is selected from a set of locations within the packet, the data selected being associated with the input port from which the packet was received from, and
    wherein the attributes include a destination, and wherein (i) a default value for the destination is a per port defined value, and (ii) the destination is a sum of (a) the result of the classification operation, (b) the default value, and (c) a channel number associated with the packet.

2. The method of claim 1, wherein receiving the packet includes adding bytes to a front of the packet.

3. The method of claim 2, wherein a configurable number of the bytes to add to the front of the packet is determined based upon the input port the packet was received from.

4. The method of claim 1, wherein a number of the set of locations is nine or fewer.

5. The method of claim 1, wherein the classification operation includes performing a lookup in a lookup structure based on the data selected from within the packet.

6. The method of claim 5, wherein the lookup structure is a ternary content-addressable memory (TCAM).

7. The method of claim 6, wherein generating attributes for the packet includes combining data from the result of the classification operation with at least one of i) data from the packet and ii) information forwarded from the input port the packet was received from.

8. The method of claim 1, wherein the data other than the data selected from within the packet includes at least one of i) the channel number and ii) a programmable identifier associated with the input port the packet was received from.

9. The method of claim 8, wherein the at least one of the channel number and the programmable identifier are configurable on a per-port basis.

10. The method of claim 9, wherein the at least one of the channel number and the programmable identifier are received from the input port the packet was received from.

11. The method of claim 8, wherein the programmable identifier identifies a particular group of ports in the classification operation.

12. A packet processing apparatus, the apparatus comprising:
    a circuit configured to:
        receive a packet at a classifier from a plurality of input ports connected to the classifier;

perform a classification operation based upon data selected from within the packet and data other than the data selected from within the packet;

generate attributes for the packet based upon a result of the classification operation; and forward the attributes along with the packet to facilitate subsequent packet-processing operations, wherein the data selected from within the packet is selected from a set of locations within the packet, the data selected being associated with the input port from which the packet was received from, and wherein the attributes include a destination, and wherein (i) a default value for the destination is a per port defined value, and (ii) the destination is a sum of (a) the result of the classification operation, (b) the default value, and (c) a channel number associated with the packet.

13. The apparatus of claim 12, wherein the circuit is further configured to add bytes to a front of the packet.

14. The apparatus of claim 13, wherein the circuit is further configured to determine a configurable number of the bytes to add to the front of the packet based upon the input port the packet was received from.

15. The apparatus of claim 12, wherein a number of the set of locations is nine or fewer.

16. The apparatus of claim 15, wherein the circuit is further configured to perform a lookup in a lookup structure based on the data selected from within the packet.

17. The apparatus of claim 16, wherein the lookup structure is a ternary content-addressable memory (TCAM).

18. The apparatus of claim 17, wherein the circuit is further configured to combine data from the result of the classification operation with at least one of i) data from the packet and ii) information forwarded from the input port the packet was received from.

19. The apparatus of claim 12, wherein the data other than the data selected from within the packet includes at least one of i) the channel number and ii) a programmable identifier associated with the input port the packet was received from.

20. The apparatus of claim 19, wherein the at least one of the channel number and the programmable identifier are configurable on a per-port basis.

21. The apparatus of claim 20, wherein the at least one of the channel number and the programmable identifier are received from the input port the packet was received from.

22. The apparatus of claim 19, wherein the programmable identifier identifies a particular group of ports in the classification operation.

23. A system for processing a packet, the system comprising:

a fabric switch; and a plurality of lines cards communicably coupled to the fabric switch, wherein at least one of the line cards includes a network processor configured to:

receive the packet at a classifier from a plurality of input ports connected to the classifier;

perform a classification operation based upon data selected from within the packet and data other than the data selected from within the packet;

generate attributes for the packet based upon a result of the classification operation; and forward the attributes along with the packet to facilitate subsequent packet-processing operations, the data selected from within the packet is selected from a set of locations within the packet, the data selected being associated with the input port from which the packet was received from, and wherein the attributes include a destination, and wherein (i) a default value for the destination is a per port defined value, and (ii) the destination is a sum of (a) the result of the classification operation, (b) the default value, and (c) a channel number associated with the packet.

* * * * *